(No Model.) 3 Sheets—Sheet 1.

C. F. AMES.
RECORDING BALANCE.

No. 481,543. Patented Aug. 30, 1892.

Witnesses
Trow Peterson
C. E. Humphrey

Inventor
Clarence F. Ames
C. P. Humphrey
Attorneys (No Model.) 3 Sheets—Sheet 2.

C. F. AMES.
RECORDING BALANCE.

No. 481,543. Patented Aug. 30, 1892.

Witnesses:

Inventor
CLARENCE F. AMES (No Model.) 3 Sheets—Sheet 3.

C. F. AMES.
RECORDING BALANCE.

No. 481,543. Patented Aug. 30, 1892.

Witnesses
Inventor
CLARENCE F. AMES
Attorney

UNITED STATES PATENT OFFICE.

CLARENCE F. AMES, OF AKRON, OHIO.

RECORDING-BALANCE.

SPECIFICATION forming part of Letters Patent No. 481,543, dated August 30, 1892.

Application filed March 18, 1892. Serial No. 425,408. (No model.)

*To all whom it may concern:*

Be it known that I, CLARENCE F. AMES, a citizen of the United States, residing at Akron, in the county of Summit and State of Ohio, have invented a certain new and useful Improvement in Registering-Scales, of which the following is a specification.

My invention has relation to improvements in that class of scales having a horizontal beam provided with a dependent poise and arranged to be actuated by the increase or diminution of the poise-weights and the sliding weight and present type-numerals indicative of the weight of the article placed in the scale in such manner that an impression can be taken from them.

The object of my invention is to produce an improved scale-beam and printing device in which numeral-type shall be accurately and easily operated to represent the amount of the article weighed, a simple and effective apparatus for taking an impression from said type, mechanism for retaining the parts rigidly during the operation of taking the impression, and generally to provide simple and effective apparatus for operating these several parts.

To the aforesaid object my invention consists in the peculiar and novel construction, arrangement, and combination of parts hereinafter described, and then specifically pointed out in the claims, reference being had to the accompanying drawings, forming a part of this specification.

Figure 1:
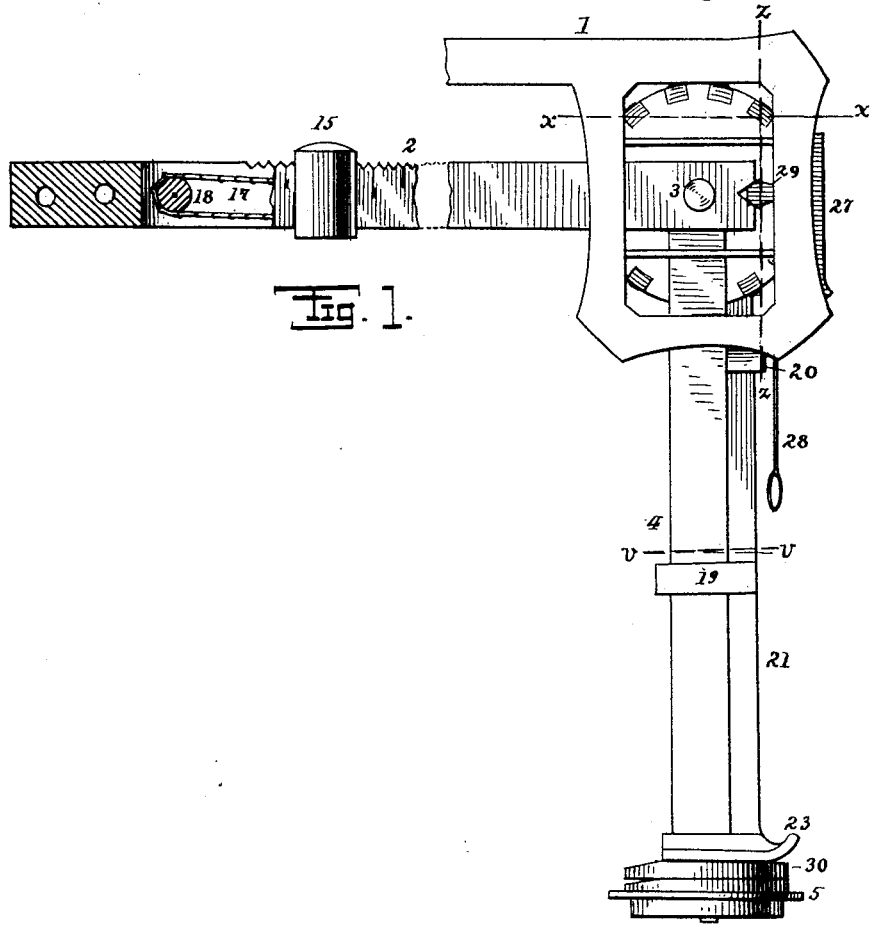
Figure 2:
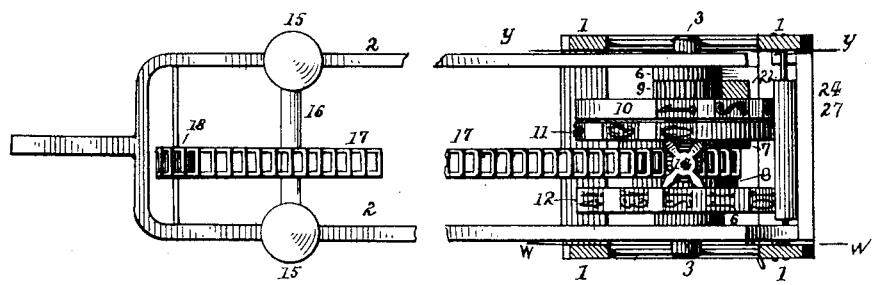
Figure 5:
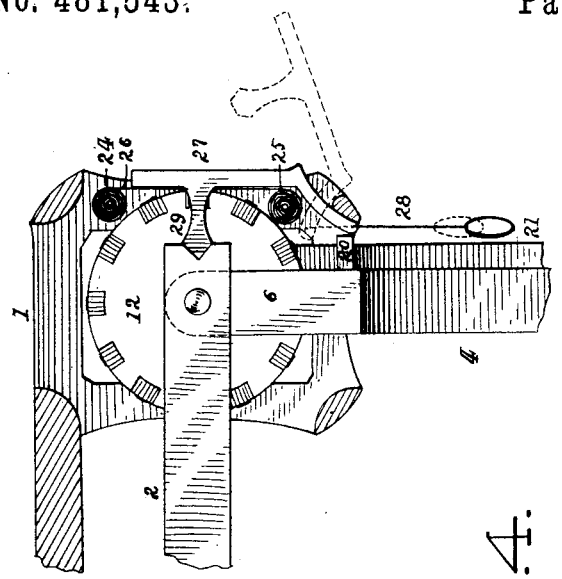
Figure 6:
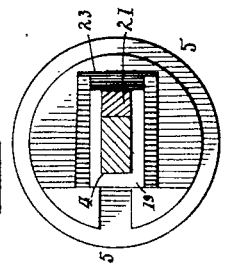
Figure 4:
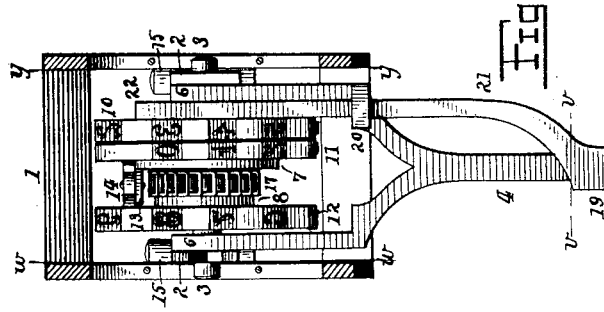
Figure 3:
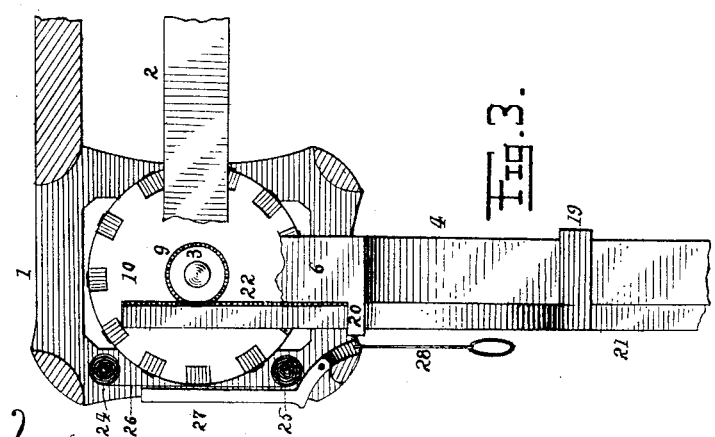
Figure 7:
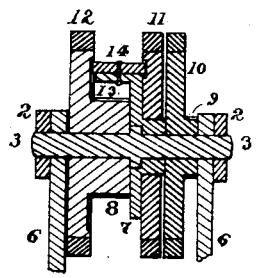
Figure 8:
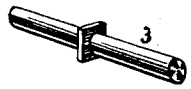
Figure 9:
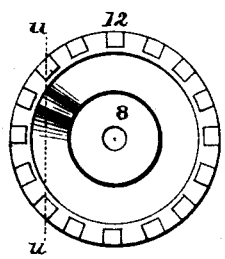
Figure 11:
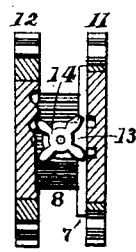
Figure 10:
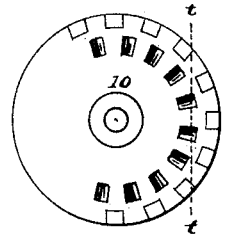
Figure 12:
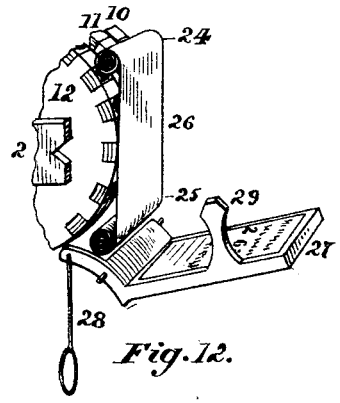

In the accompanying drawings, in which similar reference-numerals indicate like parts in the several figures, Figure 1 is a side elevation of the scale-beam, pendant, and part of the beam-frame, showing the location of the printing device; Fig. 2, a plan of Fig. 1, the beam-frame in section at the line $x\,x$; Fig. 3, an elevation, looking from the opposite side of Fig. 1, of parts of the beam, beam-frame, registering device, and pendant, the beam-frame in section at the line $y\,y$ of Figs. 2 and 4; Fig. 4, an end elevation looking from the right of Fig. 1, the beam-frame in section at the line Z Z of Fig. 1, the printing device being omitted; Fig. 5, an elevation similar to Fig. 3, looking from the opposite side, the beam-frame in section at the line W W of Figs. 2 and 4; Fig. 6, a sectional view of the pendant at the line V V of Figs. 1 and 4; Fig. 7, a vertical section through the printing-wheels and pivot lengthwise of the pivot; Fig. 8, a perspective of the pivot of said wheels; Figs. 9 and 10, inner elevations of the printing-wheels 12 and 11, respectively; Fig. 11, a plan of printing-wheels 11 and 12 in section at the lines $u\,u$ and $t\,t$ of Figs. 9 and 10, repectively, with interposed spur-wheel; and Fig. 12, a perspective of portions of the printing-wheels with the ink ribbon and rolls and the platen detached from the frame.

Referring to the drawings, 1 represents so much of the beam-frame as is deemed necessary to illustrate my invention, and which will be readily understood by those skilled in the art to which this invention pertains, arranged to be attached at its opposite end to the upright post of the scale. (Not shown.) The scale-beam 2 is bifurcated from its point of attachment in the scale-post and bears at its outer end, suspended by a pivot 3, a pendant bar 4, also bifurcated and united in a single bar bearing a disk 5, to be hereinafter described. The pivot 3 is rigidly fixed on the ends of the scale-beam 2 and bears the upper ends 6 of the pendant 4, and on it are rigidly mounted a fixed disk or narrow drum 7 by means of a square flange (see Fig. 8) and a loose drum 8, each for a purpose to be stated.

Loosely mounted on the shaft 3 is a gear-wheel 9 and a disk 10, the two being either integral or rigidly united and the latter provided on its face with type extending in numerals from "0" to "9;" also, loosely mounted on the disk 7 is a similar disk 11, bearing like numerals and of the same form. The drum 8 bears a similar type-wheel 12, of which it constitutes the hub, and toward the flange 7 is toothed to form a sprocket-wheel, the details of which are not shown, but will be apparent from the relative position of the parts to persons skilled in the art to which this invention pertains.

Between the disks 11 12 and journaled on a pivot projecting from a bracket 13, extending from the fixed disk 7, is a spur-wheel 14. The teeth of this wheel are arranged to rest in an annular channel in the adjacent face of the disk 12 and to be engaged by a single tooth on the interior thereof at each revolution and to similarly rest in a like channel in the adjacent face of the disk 11, provided with ten notches arranged to be severally engaged by the teeth of said wheel at each partial revolution, (see Figs. 7, 9, 10, and 11,) the parts being so arranged that at each revolution of the disk 12 the disk 11 will, by means of the spur-wheel 14, be turned forward one number.

Sliding on the duplex scale-beam 2 are weights 15, united by a bar 16, so as to move in unison, and which bar is attached to an endless sprocket-chain 19, which runs on the sprocket-wheel of the drum 8, and a loose pulley 18, mounted on a pivot between the arms of the scale-beam 2. By this arrangement the movement of the weights 15 along the scale-beam will cause a partial or entire revolution of the disk 12, and at each revolution thereof the disk 11 is turned forward one section or number.

Connected with the pendant-bar 4 by means of straps 19 20 is a vertically-sliding bar 21, the upper end of which bears a rack 22, arranged to engage the gear-wheel 9 and the lower end of which terminates in a shoe 23, which rests normally on the disk 5.

Pivoted in the frame 1 are two rolls 24 25, on which is wound and between which is carried an ink-saturated ribbon 26.

Pivotally mounted in the frame 1 is a rocking platen 27, arranged by means of a pendant 28 to be rocked upward against the ribbon 26 and force it against the numerals presented on the faces of the disks 10 11 12. This platen carries at one side a blunted finger 29, arranged to engage a notch in the end of the scale-beam and retain the latter rigidly during the process of printing or taking the impression from the type-disks, hereinbefore described.

The operation of the several parts is as follows: The scale being in equilibrium, the load is placed on the platform or in the scale-pan. If it exceeds ten pounds a weight 30, adapted to counterbalance ten pounds, is interposed between the disk 5 and the shoe 23, the weight being beveled at one side so as to readily slide under the shoe 23, and for every multiple of ten an additional weight is added. The insertion of these weights raises the bar 21 and thereby causes, by means of the rack 22 and gear-wheel 9, a partial revolution of the type-disk 10 equal to the number of the weights inserted and causes it to present in front of the inked ribbon a type-numeral indicating the weight. The balance-weights 15 are then moved along the scale-beam until the load is balanced, in which movement the disk 12, which represents ounces, is revolved by the sprocket-chain 17, and at each revolution turns, by means of the spur-wheel 14, the type-wheel 11, which represents pounds, until a correct balance is reached. The wheels 10 11 12 are so arranged that when the load on the scale is balanced their respective figures indicating the weight will be presented in line opposite the ink-ribbon. A strip of paper being then placed on the platen 27, the latter is swung upward against the ink-ribbon and compresses it against the type-disks 10 11 12, thereby imprinting on the paper the number of pounds and ounces indicated by the scale. During the moment of impact between the platen and type-wheels the latter are rigidly held in position by the finger 29, which in this operation precedes the impact of the platen and enters a notch in the bifurcated end of the scale-beam, and hence it will be obvious that if the scale be not balanced this finger will not enter said notch and no impact will be made by the platen.

Having thus described my invention, I claim—

1. In a recording-scale of the class designated, the bifurcated scale-beam and the pendant pivotally connected with its free end and the two type-disks loosely mounted on a pivot in said free end, one having a toothed hub and a single lateral and the other having a series of lateral teeth, and a spur-wheel interposed between said type-disks arranged to be engaged by the single tooth of one disk at each revolution thereof and cause a partial revolution of the opposite disk, combined with an endless chain running on the hub of said single-toothed disk and a pulley at the opposite end of the scale-beam and attached to and arranged to move with a sliding weight on said beam, substantially as shown and described.

2. In a scale of the class designated, the combination, with the bifurcated scale-beam and the sliding weight, of the two parallel disks bearing radial type, one whereof has a toothed hub, and the intermediate spur-wheel, and the endless chain running on said hub, and a pulley at the opposite end of said beam and attached to and moved by said weight to cause revolutions of one disk and through said spur-wheel a partial revolution of the other and the rocking platen to force a paper against the type of said disks, substantially as shown and described.

3. In a scale of the class designated, the scale-beam bearing at its free end a pendant having a disk at its lower end and a disk bearing radial type and having a toothed hub loosely mounted on a pivot in the free end of said beam, combined with a bar arranged to slide lengthwise of said pendant, having a rack arranged to mesh in said toothed hub, and a shoe adjacent to the disk of said pendant, arranged to be raised by the interposition of weights between said shoe and disk and cause a partial rotation of the type-bearing disk as each weight is interposed, substantially as shown and described.

4. The combination, with the scale-beam 2 and pendant 4, of the disks 10 11 12, each having the radial type, the first and last having toothed hubs, and the spur-wheel 14, arranged to engage lateral teeth in the disks 11 and 12, and the chain 17, roller 18, weight 15, attached to said chain, and the sliding bar 21, having the rack 22, meshing in the toothed hub of the disk 10 and arranged to be raised by the interposition of a weight beneath its lower end, all constructed and arranged substantially as shown and described, and for the purpose specified.

5. In a scale of the class designated, the scale-beam bearing at its free end a series of type-disks arranged to present radial type to indicate the load on the scale, combined with an ink-ribbon mounted on rollers opposite said disks, and a platen arranged to be rocked and force said ribbon against said type and to bear a paper to secure the impression therefrom, substantially as shown and described.

6. In a scale of the class designated, the scale-beam bearing at its free end a series of type-disks arranged to present figures to indicate the load on the scale and a device, as an ink-ribbon, to ink said figures, combined with a platen pivotally mounted in the beam-frame, arranged to bear a paper and to be rocked against said type-disks, and a projection connected with said platen and arranged to enter a recess or notch in the end of said scale-beam to retain it from movement during the contact of the platen and type-disks, substantially as shown and described.

In testimony that I claim the above I hereunto set my hand.

CLARENCE F. AMES.

In presence of—
C. P. HUMPHREY,
C. E. HUMPHREY.